US 9,989,672 B2

(12) United States Patent
Stenneth et al.

(10) Patent No.: US 9,989,672 B2
(45) Date of Patent: Jun. 5, 2018

(54) METHOD AND APPARATUS FOR DETERMINING WEATHER DATA CONFIDENCE

(71) Applicant: HERE Global B.V., Eindhoven (NL)

(72) Inventors: Leon Oliver Stenneth, Chicago, IL (US); Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 409 days.

(21) Appl. No.: 14/500,367

(22) Filed: Sep. 29, 2014

(65) Prior Publication Data

US 2016/0092615 A1 Mar. 31, 2016

(51) Int. Cl.
G06F 17/50 (2006.01)
G01W 1/00 (2006.01)

(52) U.S. Cl.
CPC ........ G01W 1/00 (2013.01); G01W 2001/006 (2013.01)

(58) Field of Classification Search
CPC ................ G06F 17/5009; G01W 1/00; G01W 2001/006
See application file for complete search history.

(56) References Cited

U.S. PATENT DOCUMENTS

| 6,240,369 B1 | 5/2001 | Foust |
| 7,275,089 B1 | 9/2007 | Marshall et al. |
| 7,406,382 B2 | 7/2008 | Brulle-Drews |
| 8,060,308 B2 | 11/2011 | Breed |
| 8,314,730 B1 | 11/2012 | Musiak et al. |
| 8,332,084 B1 * | 12/2012 | Bailey ..................... G01W 1/10 701/10 |
| 8,607,154 B2 | 12/2013 | Watts et al. |
| 8,782,041 B1 * | 7/2014 | Daniel ............. G06F 17/30864 707/724 |
| 9,030,499 B2 | 5/2015 | Börger et al. |
| 2005/0192724 A1 | 9/2005 | Hendry |
| 2008/0168339 A1 | 7/2008 | Hudson et al. |

(Continued)

FOREIGN PATENT DOCUMENTS

WO    WO 2003/000513 A1    1/2003

OTHER PUBLICATIONS

Daly et al., "Physiographically sensitive mapping of climatological temperature and precipitation across the conterminous United States", International Journal of Climatology, 2008.*

(Continued)

Primary Examiner — Kamini S Shah
Assistant Examiner — Steven W Crabb
(74) Attorney, Agent, or Firm — Alston & Bird LLP

(57) ABSTRACT

A method, apparatus and computer program product are provided for weather station data usage based on weather data confidence. In the context of a method, the method includes receiving historical weather data associated with a candidate weather station and plurality of weather stations, determining distances between a candidate weather station and respective ones of the plurality of weather stations, and generating a station to station location based model of weather attribute errors associated with the distances between the candidate weather station and the respective weather stations of the plurality of weather stations.

21 Claims, 8 Drawing Sheets

(56) References Cited

U.S. PATENT DOCUMENTS

| | | | | |
|---|---|---|---|---|
| 2012/0158207 A1* | 6/2012 | MacNeille | ............... | G01W 1/00 |
| | | | | 701/1 |
| 2013/0014046 A1* | 1/2013 | Watts | ....................... | G01W 1/00 |
| | | | | 715/772 |
| 2014/0358441 A1* | 12/2014 | Hale | ....................... | G01W 1/02 |
| | | | | 702/3 |
| 2015/0233772 A1* | 8/2015 | Atkinson | ............... | G01K 7/427 |
| | | | | 702/130 |
| 2015/0253458 A1* | 9/2015 | Purnhagen | ............. | G01K 11/00 |
| | | | | 374/136 |
| 2015/0283879 A1* | 10/2015 | Tjandra | .............. | B60H 1/00778 |
| | | | | 165/202 |
| 2015/0317588 A1 | 11/2015 | D'Amelia | | |
| 2016/0266249 A1* | 9/2016 | Kauffman | ................ | G01S 7/003 |

OTHER PUBLICATIONS

PythonForBeginners, "Scraping Wunderground", Sep. 26, 2013. Retreived from the Internet <URLhttp://www.pythonforbeginners.com/scraping/scraping-wunderground> [retrieved on Sep. 21, 2016 2:02:44 PM].*

Hanigan, I., et al., "A Comparison of Methods for Calculating Population Exposure Estimates of Daily Weather for Health Research Help with Weather History Reports", *International Journal of Health Geographics*, Sep. 13, 2006, 16 pages, retrieved from <http://weathersource.com/help-with-the-weather-history-reports> on Dec. 13, 2016.

\* cited by examiner

METHOD AND APPARATUS FOR DETERMINING WEATHER DATA CONFIDENCE

TECHNOLOGICAL FIELD

An example embodiment of the present invention relates to weather data usage and, more particularly, to a method, apparatus and computer program product for determining weather data confidence based on a station to station location based weather data error model.

BACKGROUND

Weather stations may include various weather sensors for detection and reporting of an abundance of weather attributes, such as temperature, humidity, barometric pressure, viability, precipitation, wind speed, wind direction, or the like. Control systems may request and/or receive location weather sensor data from one or more weather stations for display to a user or in some instances control of control system functions, such as dangerous driving condition systems. One example may include autonomous/driverless cars or vehicles equipped with assisted driving.

One drawback of using location based weather data is that the weather data may not be relevant to the actual location of the user or control system. For example, weather data indicating reduced visibility or rain 25 kilometers from the control system may not be relevant, since the reduced visibility or rain may not be affecting the location of the control system. Reliance on weather data which is not relevant to the location of the control system may cause unnecessary triggering of control system functions, such as turning off high/low beam headlights, activating fog lights, energizing an anti-lock braking system, activating a speed governor, or the like.

BRIEF SUMMARY

A method, apparatus and computer program product are provided in accordance with an example embodiment for determining weather data confidence based on a station to station location based weather data error model. In an example embodiment, a method is provided that includes receiving historical weather data associated with a candidate weather station and a plurality of weather stations, determining distances between the candidate weather station and respective ones of the plurality of weather stations, and generating a station to station location based model of weather attribute errors associated with the distances between the candidate weather station and the respective weather stations.

In an example embodiment, the method also includes discarding weather data that satisfies a predetermined distance threshold. In some example embodiments, the method includes discarding weather data that satisfies a predetermined outlier threshold. In an example embodiment, the method also includes causing the transmission of a weather query.

In an example embodiment, a method is provided that includes receiving weather data and station to station location based models associated with a plurality of candidate weather stations, determining, for a respective candidate weather station, an expected attribute error based on the distance from the respective candidate weather station and the station to station location based model of the respective weather station, and determining weather data confidence for the weather station data of the respective candidate weather station based on the expected weather attribute error.

In some example embodiments, the method also includes determining a weather condition based on the weather data which satisfies a predetermined weather data confidence threshold. In an example embodiment of the method, the method also includes activating or adjusting control system settings based on the determined weather condition. In another example embodiment, the method also includes causing weather data to be displayed based on weather data which satisfies a predetermined weather data confidence threshold. In an example embodiment, the method also includes causing the transmission of a weather query.

In another embodiment, an apparatus is provided including at least one processor and at least one memory including computer program code, with the at least one memory and computer program code configured to, with the processor, cause the apparatus to at least receive historical weather data from a candidate weather station and a plurality of weather stations, determine a distance between the candidate weather station and respective ones of the plurality of weather stations, and generate a station to station location based model of weather attribute errors associated with the distance between the candidate weather station and the respective weather stations.

In an example embodiment of the apparatus, the at least one memory and the computer program code are further configured to discard weather data that satisfies a predetermined distance threshold. In some example embodiments of the apparatus, the at least one memory and the computer program code are further configured to discard weather data that satisfies a predetermined outlier threshold. In a further example embodiment of the apparatus, the at least one memory and the computer program code are further configured to cause the transmission of a weather query.

In another embodiment, an apparatus is provided including at least one processor and at least one memory including computer program code, with the at least one memory and computer program code configured to, with the processor, cause the apparatus to at least receive weather data and station to station location based models associated with a plurality of candidate weather stations, determine, for a respective candidate weather station, an expected attribute error based on the distance from the respective candidate weather station and the station to station location based model of the respective weather station, and determine weather data confidence for the weather station data of the respective candidate weather station based on the expected weather attribute error.

In some example embodiments of the apparatus, the at least one memory and the computer program code are further configured to determine a weather condition based on the weather data which satisfies a predetermined weather data confidence threshold. In an example embodiment of this apparatus, the at least one memory and the computer program code are further configured to activate or adjust control system settings based on the determined weather condition. In an example embodiment of the apparatus, the at least one memory and the computer program code are further configured to cause weather data to be displayed based on weather data which satisfies a predetermined weather data confidence threshold. In a further example embodiment of the apparatus, the at least one memory and the computer program code are further configured to cause the transmission of a weather query.

In a further example embodiment, a computer program product is provided including at least one non-transitory computer-readable storage medium having computer-executable program code portions stored therein, with the computer-executable program code portions comprising program code instructions configured to receive historical weather data associated with a candidate weather station and plurality of weather stations, determine distances between the candidate weather station and respective ones of the plurality of weather stations, and generate a station to station location based model of weather attribute errors associated with the distances between the candidate weather station and the respective weather stations.

In an example embodiment of the computer program product, the computer-executable program code portions further comprise program code instructions configured to discard weather data that satisfies a predetermined distance threshold. In some example embodiments of the computer program product, the computer-executable program code portions further comprise program code instructions configured to discard weather data that satisfies a predetermined outlier threshold. In an example embodiment of the computer program product the computer-executable program code portions further comprise program code instructions configured to cause the transmission of a weather query.

In a further example embodiment, a computer program product is provided including at least one non-transitory computer-readable storage medium having computer-executable program code portions stored therein, with the computer-executable program code portions comprising program code instructions configured to receive weather data and station to station location based models associated with a plurality of candidate weather stations, determine, for a respective candidate weather station, an expected attribute error based on the distance from the respective candidate weather station and the station to station location based model of the respective weather station, and determine weather data confidence for the weather station data of the respective candidate weather station based on the expected weather attribute error.

In some example embodiments of the computer program product, the computer-executable program code portions further comprise program code instructions configured to determine a weather condition based on the weather data which satisfies a predetermined weather data confidence threshold. In an example embodiment of this computer program product, the computer-executable program code portions further comprise program code instructions configured to activate or adjust control system settings based on the determined weather condition. In some example embodiments of the computer program product, the computer-executable program code portions further comprise program code instructions configured to cause weather data to be displayed based on weather data which satisfies a predetermined weather data confidence threshold. In an example embodiment of the computer program product the computer-executable program code portions further comprise program code instructions configured to cause the transmission of a weather query.

In another example embodiment an apparatus is provided including means for receiving historical weather data associated with a candidate weather station and a plurality of weather stations, means for determining distances between the candidate weather station and respective ones of the plurality of weather stations, and means for generating a station to station location based model based weather attribute errors associated with the distances between the candidate weather station and the respective weather stations.

In an example embodiment, the apparatus also includes means for discarding weather data that satisfies a predetermined distance threshold. In some example embodiments, the apparatus includes means for discarding weather data that satisfies a predetermined outlier threshold. In an example embodiment, the apparatus also includes means causing the transmission of a weather query.

In yet a further example embodiment an apparatus is provided which includes means for receiving weather data and station to station location based models associated with a plurality of candidate weather stations, means for determining, for a respective candidate weather station, an expected attribute error based on the distance from the respective candidate weather station and the station to station location based model of the respective weather station, and means for determining weather data confidence for the weather station data of the respective candidate weather station based on the expected weather attribute error.

In some example embodiments, the apparatus also includes determining a weather condition based on the weather data which satisfies a predetermined weather data confidence threshold. In an example embodiment of the apparatus, the apparatus also includes means for activating or adjusting control system settings based on the determined weather condition. In another example embodiment, the apparatus also includes means for causing weather data to be displayed based on weather data which satisfies a predetermined weather data confidence threshold. In an example embodiment, the apparatus also includes means causing the transmission of a weather query.

BRIEF DESCRIPTION OF THE DRAWINGS

Figure 1:
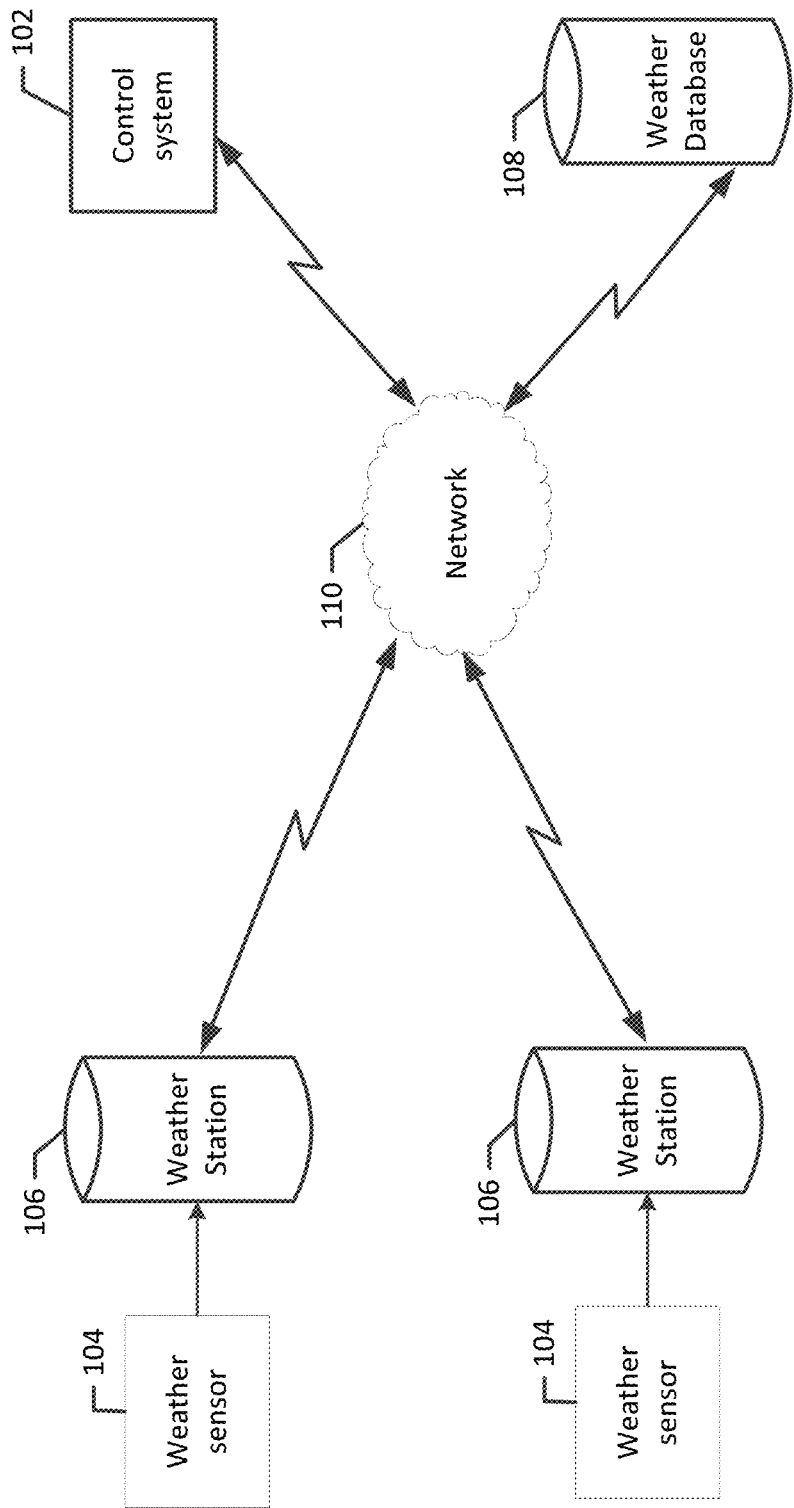
Figure 2:
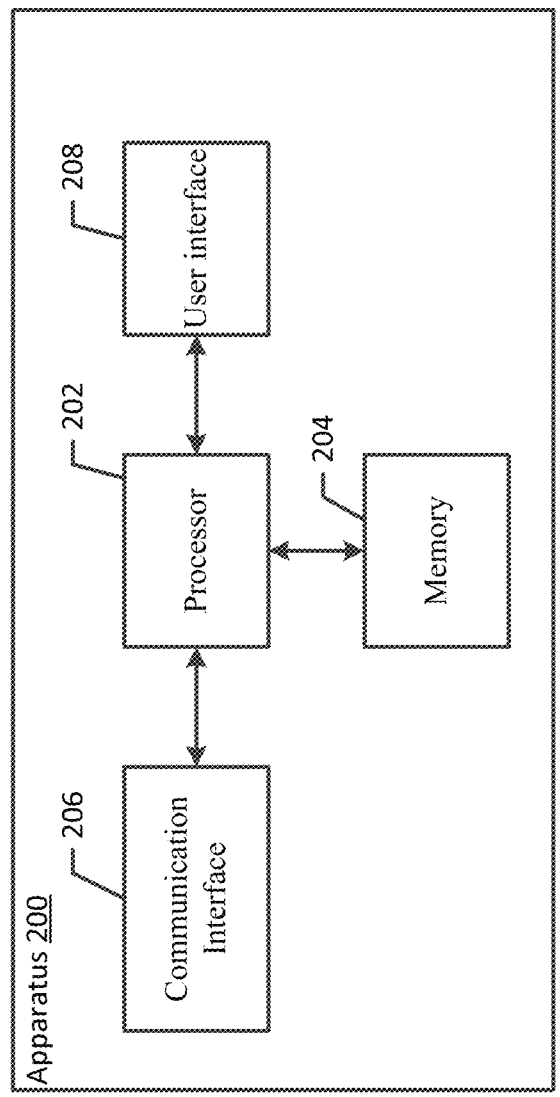
Figure 3:
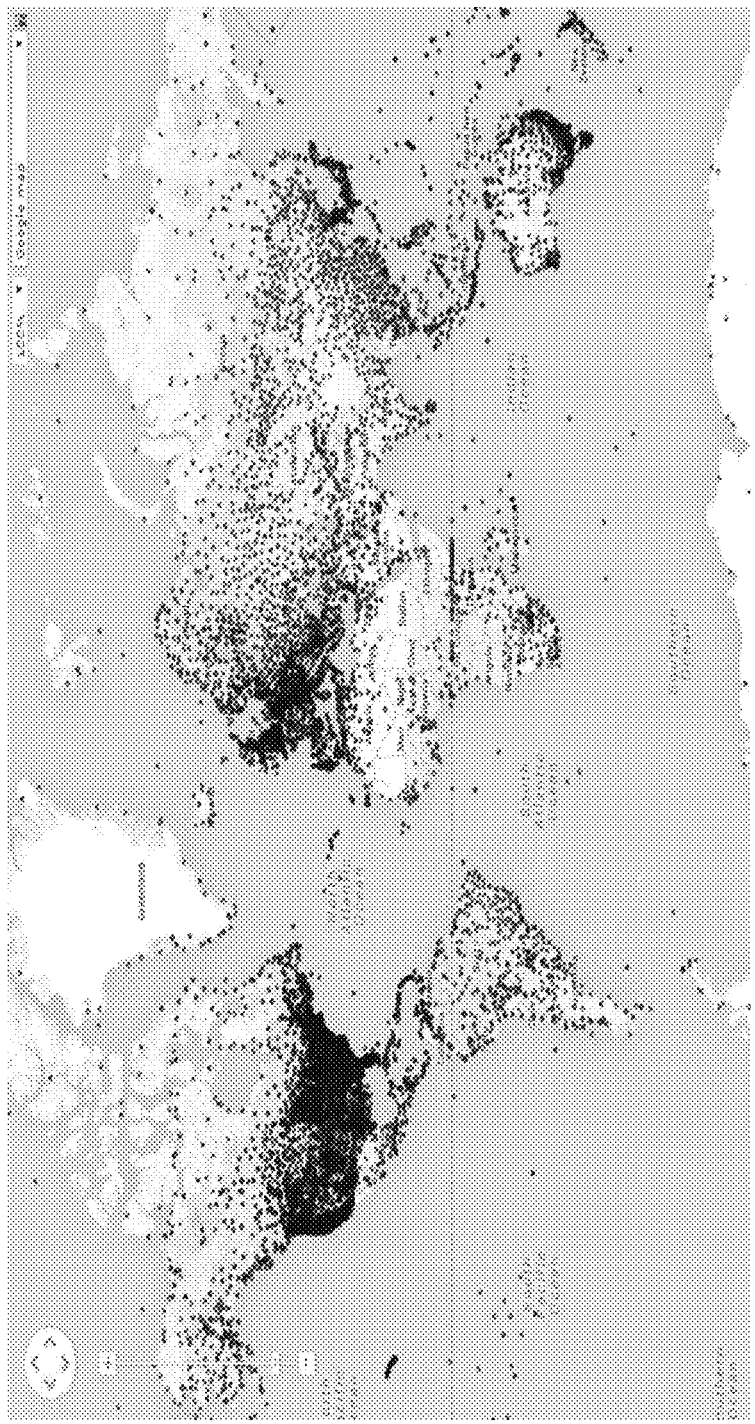
Figure 4:
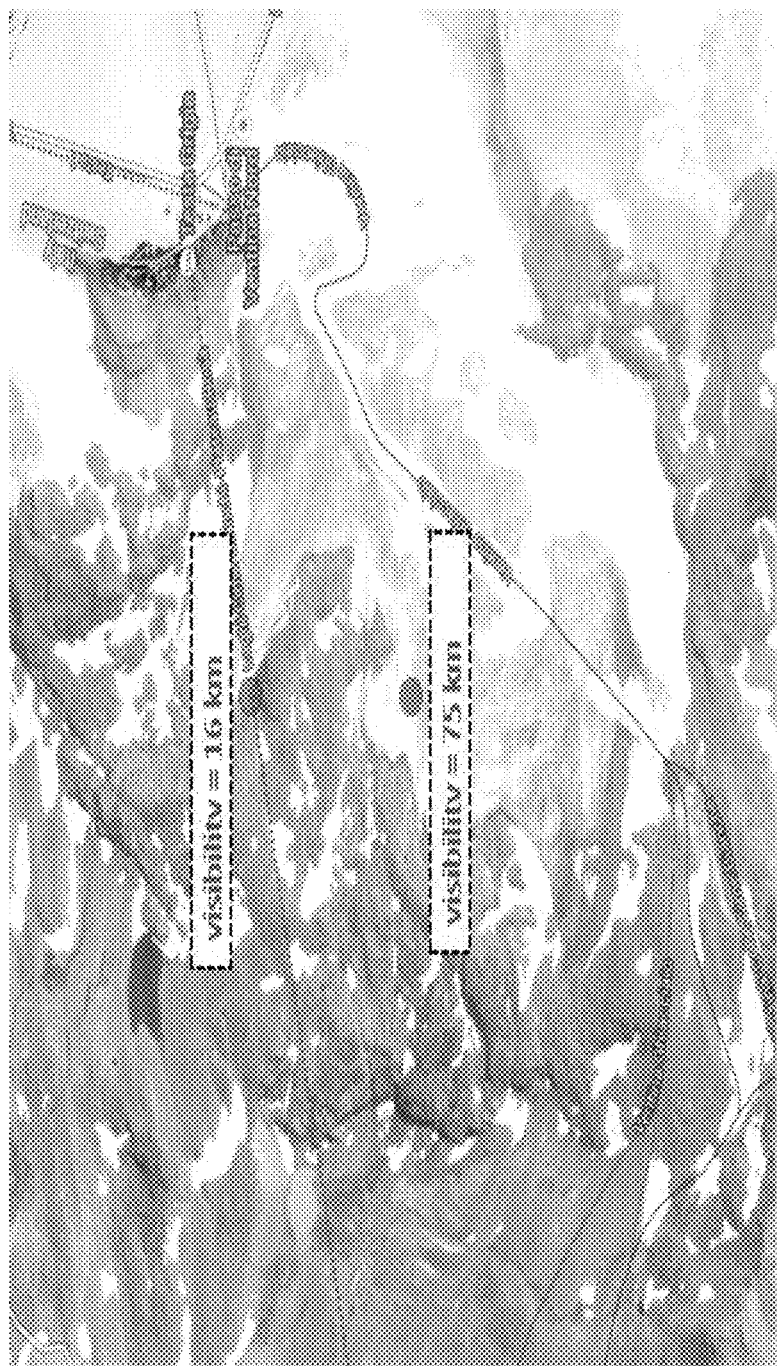
Figure 5:
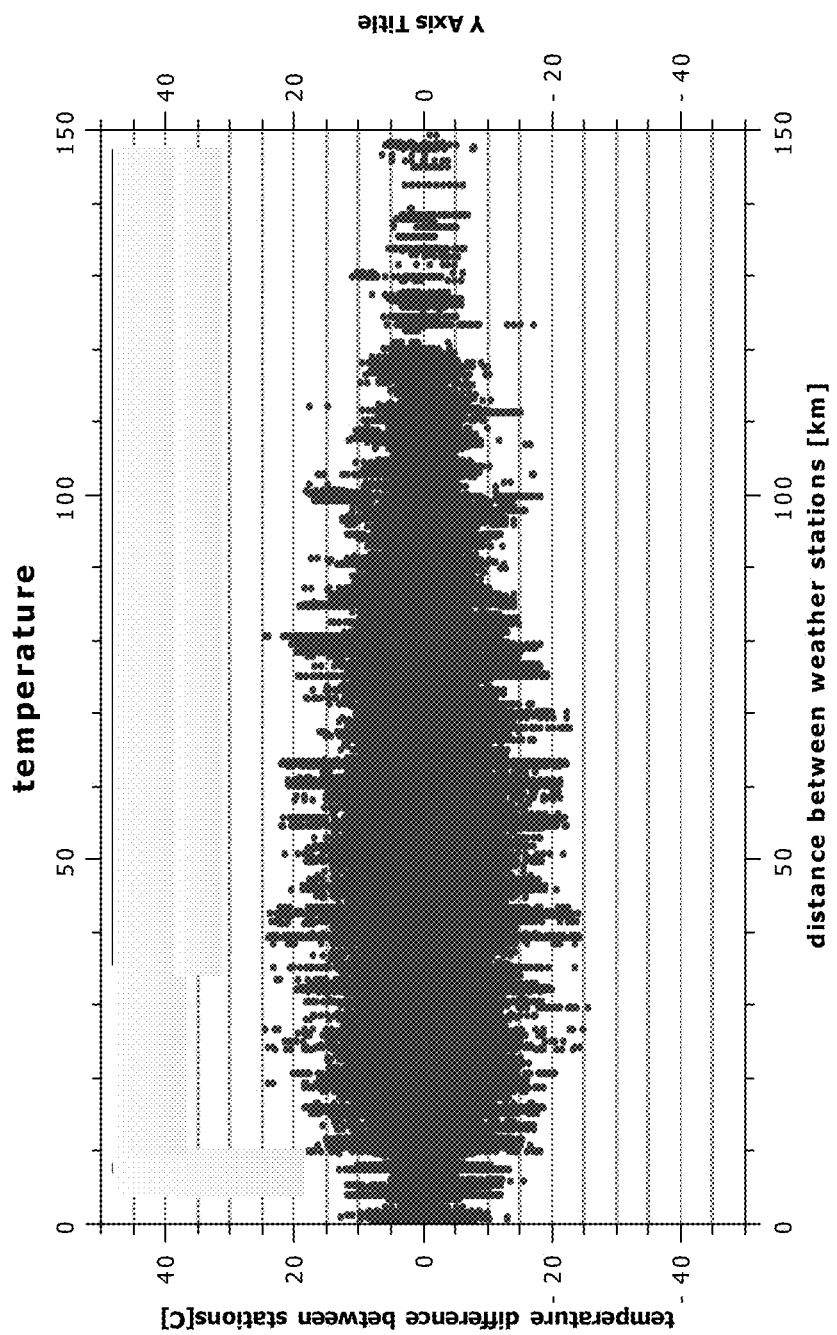
Figure 6:
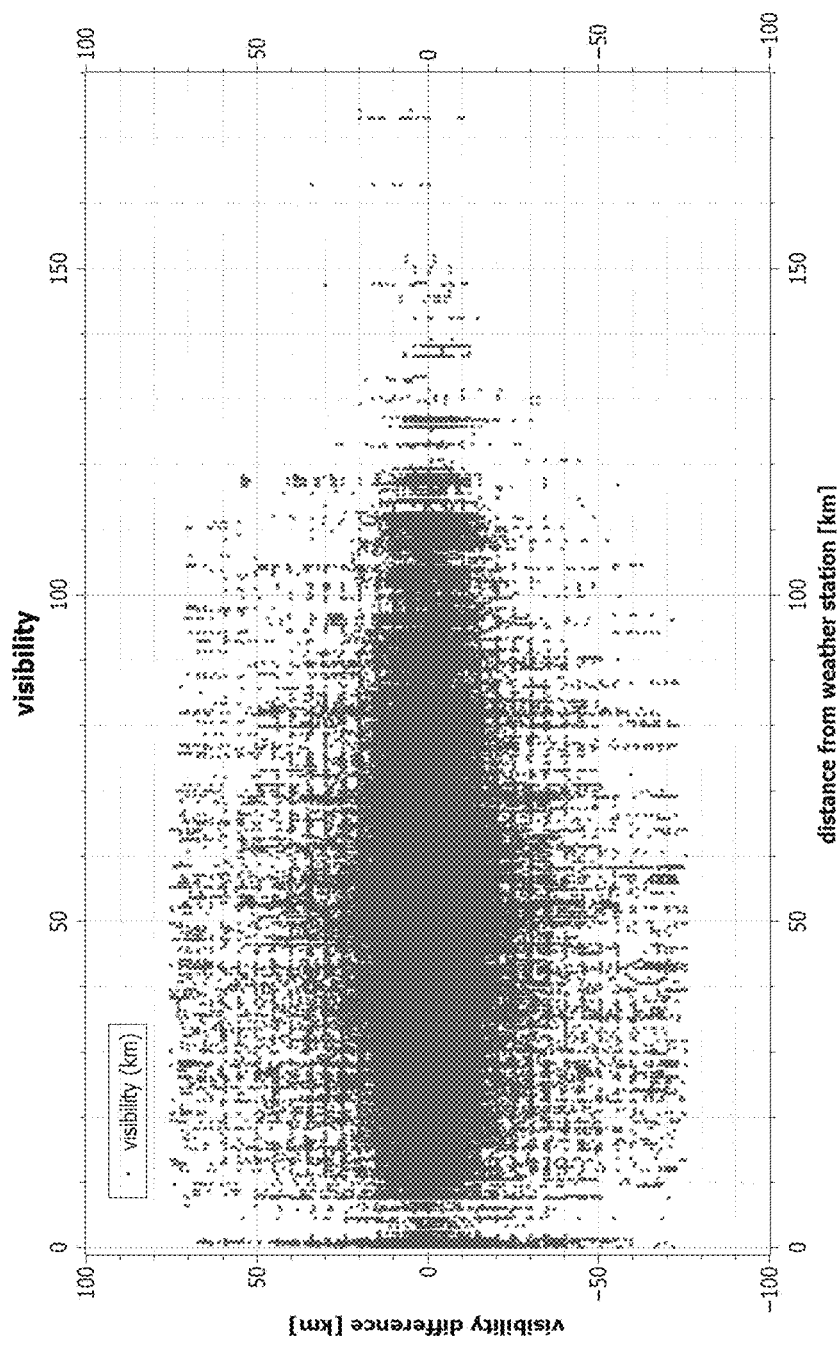
Figure 7:
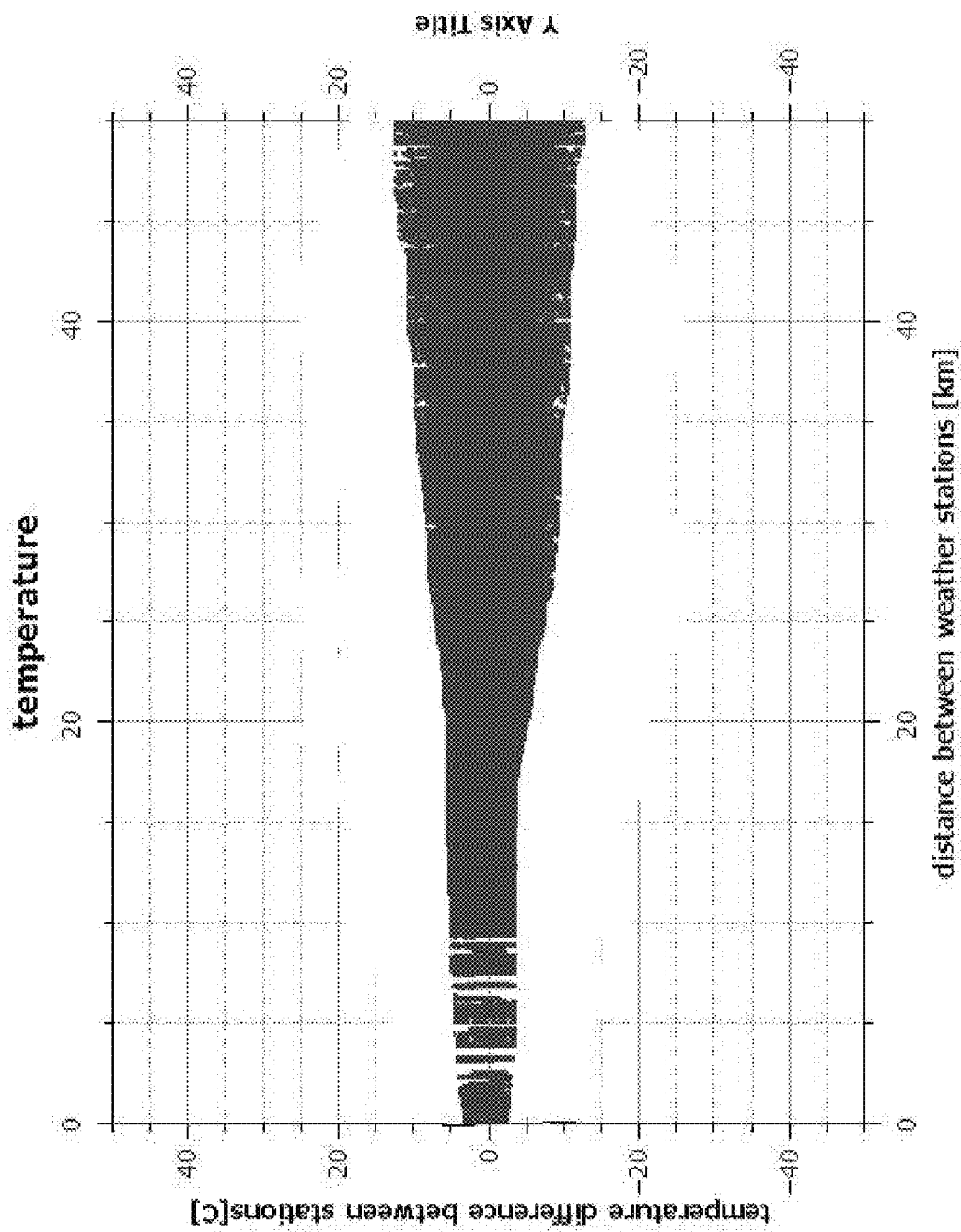
Figure 8:
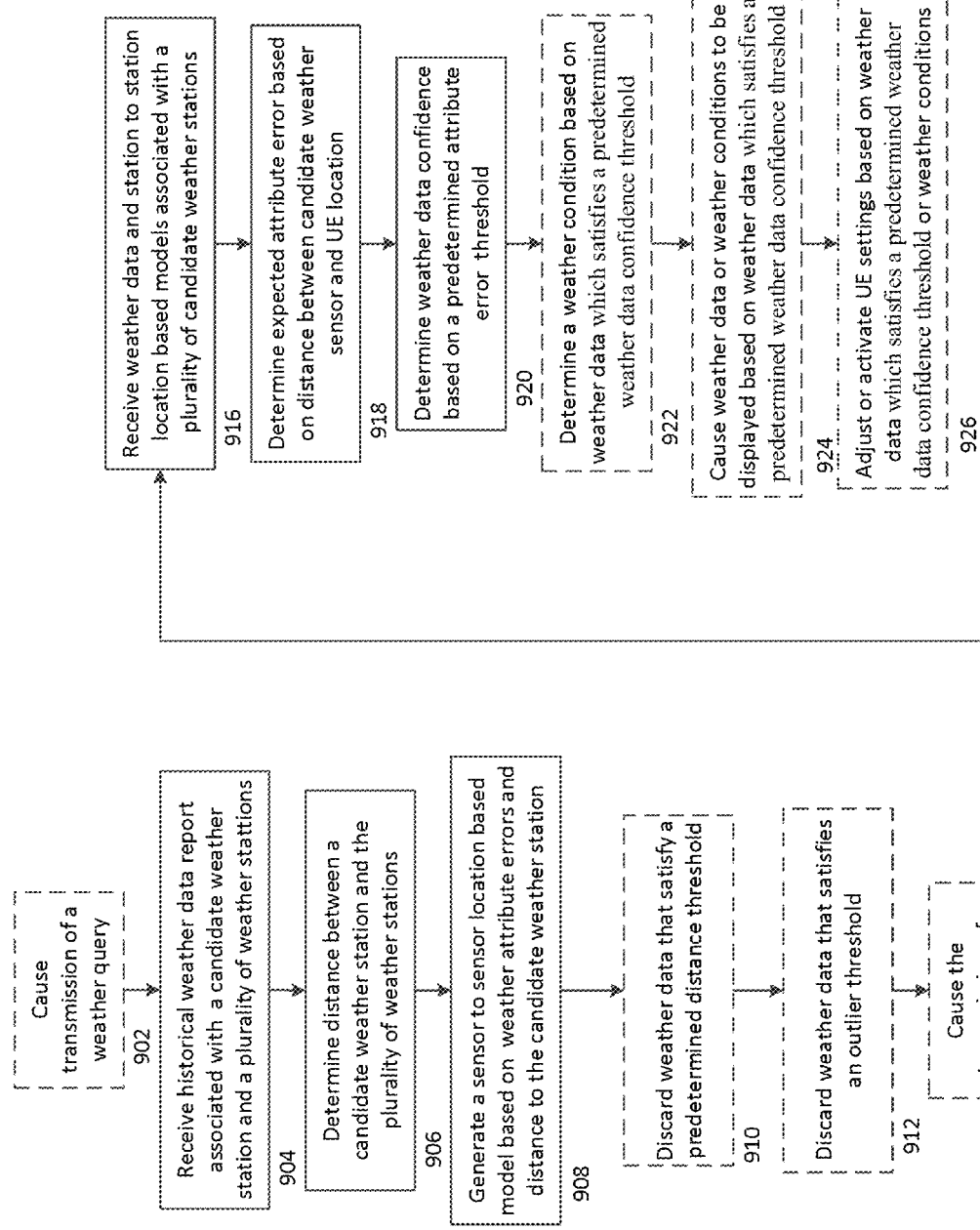

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for determining weather data confidence based on a station to station location based weather data error model in accordance with an example embodiment of the present invention;

FIG. 3 illustrates a world map depicting weather station density;

FIG. 4 illustrates a map overlay with weather sensor attribute data;

FIGS. 5-8 illustrate station to station location based models for weather data attributes in accordance with an example embodiment of the present invention; and FIGS. 5-7 illustrate station to station location based models for weather data attributes in accordance with an example embodiment of the present invention; and FIG. 8 is a flowchart illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Overview

Control system, such as vehicular control systems, may request and receive weather data from various weather station weather sensors. This weather data may be provided over a traffic message channel (TMC) or other transmission system and displayed to a user or used to control various control system functions. For example, in an instance in which a candidate TMC designated 120N04338 provides weather data from a weather station 5 kilometers from the control system, which indicates heavy snow and radar images indicating heavy snow, the control system may display heavy snow and/or control the control system functions based on heavy snow, such as activating antilock brakes or setting a speed governor on a vehicle, transmitting a snow plow request, changing expressway lane signs, or the like. In another example, however, the TMC may include weather data from two weather stations which are 5 kilometers and 5.3 kilometers away from the control system location, respectively. The first weather station weather data may indicate −2 degrees Celsius and heavy snow, and the second weather station weather data may indicate 12 degrees Celsius and no snow. In this case the control system may determine a weather data confidence and use the highest confidence weather data for display and/or control system function control.

The control system or weather provider equipment may request and/or receive historical weather data for candidate weather stations and other weather stations associated with a weather provider. The weather provider may be associated with all weather stations or a subset of the weather stations, for example weather stations in North America, weather stations in the Southeast portion of the United States, weather stations associated with weather providers which have agreed to share weather data, or the like. The control system may use location data associated with the weather stations to determine a distance between each of the candidate weather stations and each of the other weather stations. The control system may generate a station to station location based weather data error model for the candidate weather stations.

The control system may request and/or receive current weather data and station to station location based models associated with two or more candidate weather stations. The control system may determine weather attribute errors associated with the distance from the candidate weather stations and determine a reliability, or confidence level, for the weather data based on the distance from the control system and/or the candidate weather station. For example, weather data which is associated with a location farther away from the control system may have less reliability or lower confidence than weather data associated with a location nearer to the control system location.

The control system may use the weather data which has been determined to have an acceptable weather data confidence for more accurate display of weather data and/or for greater reliability in control of control system functions.

Communications Diagram

A method, apparatus and computer program product are provided in accordance with an example embodiment for weather sensor data usage based on weather data confidence. FIG. 1 illustrates a communication diagram including control system in data communications with network 110. The network 110 is in data communications with one or more weather stations 106 and/or weather database 108. The weather stations 106 may be in data communications with or include one or more weather sensors 104.

The control system 102 may be a mobile computing device, such as a laptop computer, tablet computer, mobile phone, smart phone, navigation unit, personal data assistant, or the like. Additionally or alternatively the control system 106 may be a fixed computing device, such as a personal computer, computer workstation, kiosk, office terminal computer or system, or the like. In some instances, the control system 102 may be a portion of or otherwise associated with other devices such as a vehicular control systems, a heating or air conditioning system, drainage system, irrigation system, communication system, building control system, or any other system which may use weather attribute for display or control.

The network may utilize 802.15.4, ZigBee, Bluetooth low energy, 802.11 WiFi, 802.3 wired Ethernet, power line communications, visible light communications, or any other communications method to transmit data between the weather stations 106, weather database 108, and the control system 102. The database 108 may be a portion of or associated with the weather station 106. For example, the database may be a weather station database which stores weather data collected from the various weather sensors 104 for transmission and/or later analysis. In another example the weather database may be associated with a weather server and store weather data from one or more weather stations 106 for transmission or later analysis.

As illustrated by the world map depicted in FIG. 3 there are an abundance of weather stations, represented by dots, across the world with a higher density of weather stations in the United States, Europe, and Japan. Weather stations around the world that each provide its respective weather data allow for a control system 102 to receive weather data from numerous weather stations. In some instances the weather data may be relevant and in others the weather data may not be relevant to the control system 102 location. For example, FIG. 4 illustrates weather data pertaining to visibility from two weather stations 106, which are relatively close to each other in the mountains of Switzerland. The first weather station 106 weather data indicated visibility of 16 kilometers and the second weather station weather data indicates a visibility of 75 kilometers. The control system 102 may receive weather data from either or both weather station 106. The control system 102 may determine a weather data confidence and display or use the weather data with the highest weather data confidence to control the control system functions, as discussed below.

The control system 102 may request and receive historic weather data, including weather station locations, from a candidate weather station 106 and other weather stations 106 associated with a weather provider. Historical weather data may include weather data from the respective weather station over a predetermined period, such as one week, one month, six months, one year five years, ten years, or any other time period which may be useful for determining historical weather data correlations. In some instances the historical data may include current weather data. Using the historical weather data, the control system may generate a station to station location based model.

In an instance in which the control system 102 requests historical weather data, the control system may transmit a weather data query, such as "weather/1.0/report.xml?app_id=DemoCredFo rAutomotiveAPI&app_code=JZlojTwKtPLbrQ9fEGzn1A&product=observation&latitude=41.83&longitude=-87.68" using, for example, an https protocol, to a weather provider, e.g. one or more weather stations 106 and/or to a weather database 108, using the network 110. The weather query may include the location of the candidate weather station 106 and, e.g. latitude=41.83&longitude=-87.68. The weather stations 106 or the weather database 108 may transmit a weather data report to the control system 102. The weather data report, may include historical weather data attributes indicating light conditions, weather description, temperature, comfort factor, humidity, dew point, precipitation, wind speed, wind direction, barometric pressure, visibility, snow cover, weather station location, or the like. An example weather data report is provided below.

```
<observation utcTime="2014-02-21T11:51:00.00-
06:00" elevation="186.00" distance="8.05" longitude="-
   87.7500" latitude="41.7800" city="Chicago"
   state="Illinois" country="United States">
<daylight>D</daylight>
<description>Scattered clouds. Chilly.</description>
<skyInfo>9</skyInfo>
<skyDescription>Scattered clouds</skyDescription>
<temperature>-0.61</temperature>
<temperatureDesc>Chilly</temperatureDesc>
<comfort>-9.10</comfort>
<highTemperature>*</highTemperature>
<lowTemperature>*</lowTemperature>
<humidity>61</humidity>
<dewPoint>-7.22</dewPoint>
<precipitation1H>*</precipitation1H>
<precipitation3H>*</precipitation3H>
<precipitation6H>0.00</precipitation6H>
<precipitation12H>*</precipitation12H>
<precipitation24H>*</precipitation24H>
<precipitationDesc>*</precipitationDesc>
<airInfo>*</airInfo>
<airDescription/>
<windSpeed>51.89</windSpeed>
<windDirection>240</windDirection>
<windDesc>Southwest</windDesc>
<windDescShort>SW</windDescShort>
<barometerPressure>1004.60</barometerPressure>
<barometerTrend>Rising</barometerTrend>
<visibility>16.09</visibility>
<snowCover>*</snowCover>
<icon>2</icon>
<iconName>mostlysunny</iconName>
<ageMinutes>57</ageMinutes>
<activeAlerts>3</activeAlerts>
</observation>
```

A weather data report may contain all or additional weather data attributes of the weather data report above, or contain only a subset of the weather data as depicted below.

```
<daylight>D</daylight>
<description>Scattered clouds.
Chilly.</description>
<skyinfo>9</skyinfo>
<skyDescription>Scattered
clouds</skyDescription>
<temperature>-0.61</temperature>
<temperatureDesc>Chilly</temperatureDesc>
<comfort>-9.10</comfort>
<highTemperature>*</highTemperature>
<lowTemperature>*</lowTemperature>
<humidity>61</humidity>
<dewPoint>-7.22</dewPoint>
<precipitation1H>*</precipitation1H>
<precipitation3H>*</precipitation3H>
<precipitation6H>0.00</precipitation6H>
<precipitation12H>*</precipitation12H>
<precipitation24H>*</precipitation24H>
<precipitationDesc>*</precipitationDesc>
<airInfo>*</airInfo>
<airDescription>
<windSpeed>51.89</windSpeed>
<windDirection>240</windDirection>
<windDesc>Southwest</windDesc>
<windDescShort>SW</windDescShort>
<barometerPressure>1004.60</barometerPressure>
<barometerTrend>Rising</barometerTrend>
<visibility>16.09</visibility>
<snowCover>*</snowCover>
```

The weather data query may return weather data attributes (a) from the closest k stations, e.g. $a_1, a_2, a_3, a_4, \ldots a_k$, and the distance between the candidate weather station 106 and each of the other weather stations, e.g. $d_1, d_2, d_3, d_4, \ldots d_k$. The control system 102 may utilize a station to station location based model to determine the confidence level associated with the weather information provided by each weather station. Although the station to station location based model may be determined in various manners, the following is an example algorithm which may be used to derive a station to station location based model for the respective attributes.

```
1. for (a_i ∈ A) {
2.      plot = new // start a new plot
3.      for (ws_i ∈ WS) {
4.          loc = ws_i^loc
5.          [ws_1^a1, ws_2^a1, ws_3^a1, ws_4^a1, ws_5^a1, ws_6^a1 ws_7^a1 ... ws_k^a1] = query (loc)
6.          [d_1, d_2, d_3, d_4, d_5, d_6, d_7 ... d_k] = query (loc) N.B d_i = d_1=0, i.e.
                it is GT
7.          for (int x = 1 to K){
8.              plot (d_x, |ws_i^a1 - ws_K^a1|)
9.          }
10.     }
11. }
```

The set of weather stations is represented by WS. Each of the respective weather station $ws_i \in WS$ has a location (i.e. latitude, longitude), identified as $ws_i^{loc}$. The attributes $a_1, a_2, a_3 \ldots a_n$ of weather data as reported by a weather station may be a set A={temperature $a_1$, visibility $a_2$, precipitation $a_3 \ldots$ }. A weather attribute $a_1$ from a weather sensor 104 associated with a weather station 106 $ws_i$, may be denoted as $ws_i^{a1}$.

In line 1 of the algorithm weather attributes $a_1$, e.g. temperature, visibility, precipitation, or the like, a model is created which is represented by the plot created in line 2. In line 3 the location for each weather station 106 is extracted. The weather station locations may then be used in the weather station query in line 5.

The location query may return the weather data received from the closest k weather stations. In this example, the closest of the k weather stations is the weather station which location value was used as an input parameter in the initial weather station query. Since a different station to station location based model is generated for each attribute, line 5 represents the k weather readings for the closest weather stations for the weather attribute a1, e.g. temperature. Line 6 extracts the location parameter which was inputted into the weather data query. Finally, a model may be created as a plot of the distance to each weather station 106 as computed in line 6 and the absolute difference, e.g. error in the weather attribute of each weather station and the weather station whose location was utilized in the weather data query, e.g. candidate weather station.

Using the algorithm with a k value 8 on the several weather stations across Europe and considering only a single weather attribute, e.g. temperature, the station to station location based model plot is depicted in FIG. 5. FIG. 6 depicts a station to station location based model plot for visibility.

The station to station location based model may be improved by weather station pruning and/or smoothing, e.g. outlier rejection.

Weather station pruning may be based on weather station accuracy for a given location decreasing as the distance from the designated location increases. In an example embodiment, the control system 102 may set a distance threshold, which if satisfied the weather station data is discarded from the station to station location based model. For example, the predetermined distance threshold may be 50 kilometers. In this example, all weather data associated with a weather station greater than 50 kilometers from the candidate weather station is discarded. Continuing the example of the FIG. 5 station to station location based model plot with the distance threshold of 50 kilometers applied, the weather attribute error, e.g. the absolute difference, of the weather attribute of each weather station is smallest, as indicated by the spread on the y axis when the distance to the candidate weather station location is smallest as indicated on the x axis.

The smoothing process may remove outlier weather data from the station to station location based model plot. The outlier weather data may be discarded by an outlier removal algorithm, or outlier removal threshold, such as an algorithm which removes or discards weather data based on a function of the standard deviation of attribute difference or error at each distance unit, e.g. a tenth of a kilometer, a half kilometer, a full kilometer, or any other distance unit. Other possible smoothing algorithms may be functions of the standard error from mean, confidence intervals, clustering techniques, or the like. FIG. 7 continues the example from FIG. 5 and depicts the station to station location based model to which smoothing has been applied.

The generation of the station to station location based model is performed by the control system 102 merely as an example. In some embodiments the historical weather data may be received and the generation of station to station location based models may be performed by a weather station 106 and/or a weather database 108.

The control system 102 may request and/or receive current weather data from a weather data weather provider, e.g. one or more weather stations 106 and/or a weather database 108, using the network 110. The weather stations 106 may retrieve current weather data from the weather sensors 104 and transmit a weather data report to the control system 102 and/or the weather database 108 may transmit a weather data report to the control system. The weather data report may include current weather data attributes indicating light conditions, weather description, temperature, comfort factor, humidity, dew point, precipitation, wind speed, wind direction, barometric pressure, visibility, snow cover, weather station location, or the like. The current weather data report may be substantially similar to the historical weather data report depicted above. Additionally, the control system 102 may receive station to station location based models for each of the weather stations 106 providing weather data, e.g. candidate weather stations.

The control system 102 may determine the distance between the control system and each of the candidate weather stations 106. The control system 102 may use the distances as an input to the station to station location based models to determine an expected attribute error, or absolute difference, based on the y axis of the station to station model for the given distance between the control system 102 and the candidate weather station 106 weather data on the x axis, for each of the candidate weather stations. For example, in an instance in which the control system 102 is 50 kilometers from the candidate weather station 106 the expected temperature error is approximately 20 degrees Celsius, as depicted in FIG. 7. Similarly, in an instance in which the control system 102 is 5 kilometers from the candidate weather station 106 the expected temperature error is approximately 10 degrees Celsius.

The control system 102 may determine a weather data confidence based on the expected attribute errors for each candidate weather station 106. The control system 102 may compare the attribute errors of the candidate weather stations 106 to a predetermined attribute error threshold. For example, the control system 102 may have a predetermined temperature error threshold of 10 degrees Celsius, and the control system 102 may determine that the weather data from weather stations 106 which satisfies the predetermined temperature error threshold, e.g. is less than or equal to 10 degrees Celsius, is valid or has high confidence, and weather data from weather stations which fail to meet the predetermined temperature threshold, e.g. is greater than 10 degrees Celsius, is not valid or has low confidence.

In an example embodiment, the control system 102 may additionally or alternatively assign a confidence value to the weather data of each candidate weather station based on the predetermined attribute error threshold. The confidence value may be inversely proportional to the weather attribute error associated with the weather data. For example, the control system 102 may assign a 50 percent confidence to a temperature error at the predetermined attribute threshold, e.g. 10 degrees Celsius. The control system 102 may assign higher confidence values to weather data having a smaller attribute error. For example the control system 102 may assign a confidence of 75 percent to weather data in an instance in which the temperature error is 5 degrees Celsius or 25 percent in an instance in which the temperature error is 15 degrees Celsius. The control system 102 may additionally compare the weather data confidence threshold to a predetermined confidence threshold, such as 60 percent. The weather data which satisfies the confidence threshold, e.g. greater than 60%, may be considered valid and weather data which fails to satisfy the threshold, e.g. less than 60%, may be considered invalid.

In an instance in which weather data from more than one weather station satisfies the predetermined weather data confidence threshold, the weather data used for display or control of control system functions may be an average of the weather station data from the weather stations which satisfied the threshold. The weather data average may be a weighted average of the weather data. The weights for the weighted average may be based on the attribute error. In an example embodiment, the weighted average for each weather station weather data may be inversely proportional to the respective attribute error. Alternatively, the weather data with the lowest attribute error may be chosen for display or control of control system functions.

The control system 102 may use valid weather data for activating or adjusting control system settings. For example, the control system 102 may adjust climate control settings, activate a dangerous driving condition system, such as anti-lock brakes, or fog lights, display weather data, adjust irrigation flow, or the like, based on the valid weather data.

Additionally, or alternatively the control system 102 may determine a weather condition based on the weather data confidence. For example, the control system 102 may determine that the valid weather data indicated snow, rain, fog, ice, extreme heat, low light, or the like. The control system 102 may activate or adjust control system settings based on the determined weather condition. For example, in an instance in which the control system 102 determines a weather condition associated with lowered traction, such as ice snow, rain, or the like, the control system 102 may activate or adjust a speed governor, anti-lock brakes, or the like. In another example, the weather condition determined may be associated with precipitation, such as rain, snow, sleet, or the like. The control system 102 may activate or adjust lights, such as headlights and windshield wipers, and in some instances climate controls, such as defrost.

The control system 102 may also display weather data and/or weather conditions based on the weather data confidence. For example, the control system 102 may display one or more weather attributes and/or weather conditions on a user interface, such as −2 degrees Celsius and "heavy snow."

Example Apparatus

A control system 102, a weather station 106, or a weather database 108 may include or otherwise be associated with an apparatus 200 as shown in FIG. 2. The apparatus, such as that shown in FIG. 2, is specifically configured in accordance with an example embodiment of the present invention for determining weather data confidence based on a station to station location based weather data error model. The apparatus may include or otherwise be in communication with a processor 202, a memory 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory may be non-transitory and may include, for example, one or more volatile and/or non-volatile memories. In other words, for example, the memory may be an electronic storage device (for example, a computer readable storage medium) comprising gates configured to store data (for example, bits) that may be retrievable by a machine (for example, a computing device like the processor). The memory may be configured to store information, data, content, applications, instructions, or the like for enabling the apparatus to carry out various functions in accordance with an example embodiment of the present invention. For example, the memory could be configured to buffer input data for processing by the processor. Additionally or alternatively, the memory could be configured to store instructions for execution by the processor.

As noted above, the apparatus 200 may be embodied by control system 102, weather station 106, or weather database 108. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more control systems 102, weather stations 106, weather databases 108, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

Example Process for Determining Weather Data Confidence

Referring now to FIG. 8, the operations performed, such as by the apparatus 200 of FIG. 2, for determining weather data confidence based on a station to station location based weather data error model are illustrated. Blocks 902-922 may be performed by an apparatus 200, such as the control system 102, the weather station 106, or the weather database 108. Blocks 924 and 926 may be performed by an apparatus 200, such as the control system 102. As shown in block 902 of FIG. 8, the apparatus 200 may include means, such as a processor 202, a communications interface 206, or the like, configured to cause the transmission of a weather query. The weather query may include location information for the apparatus and/or location information for the candidate weather station. The location information may define the location of the apparatus and/or the candidate weather station. The processor 202 may cause the communications interface 206 to transmit the weather query using the network 110 to one or more weather stations 106 and/or a weather database, such as weather database 108 based on the configuration of the weather provider.

As shown in block 904 of FIG. 8, the apparatus 200 may include means, such as a processor 202, communications interface 206, or the like, configured to receive a historical weather data report from a candidate weather sensor and a plurality of weather sensors 104 associated with respective weather stations 106. The historical weather data report may include historical weather data attributes indicating light conditions, weather description, temperature, comfort factor, humidity, dew point, precipitation, wind speed, wind direction, barometric pressure, visibility, snow cover, weather station location, or the like. The processor 202 may receive the historical weather data from the communications interface 206, which in turn receives the historical weather data from the weather stations, 106 and/or weather database 108 through the network 110.

As shown at block 906, of FIG. 8, the apparatus 200 may include means, such as a processor 202, memory 204, or the like, configured to determine a distance between a candidate weather sensor and each of the plurality of weather sensors. The processor 202 may extract location data from the weather data report for the candidate weather station and the other weather stations associated with the weather provider. The processor 202 may then determine the distance between the candidate weather station and each of the other weather stations associated with the weather provider based on the extracted weather station locations.

In an example embodiment, the distances between the candidate weather sensor and the respective weather sensors of the plurality of weather sensors may be stored in a memory 204 for future use.

As shown at block 908 of FIG. 8, the apparatus 200 may include means, such as a processor 202, a memory 204, or the like, configured to generate a location based model based on weather attribute errors. The processor 202 may generate a station to station location based model using the weather report data including weather station location and historical weather attribute data according to a plotting algorithm, such as the algorithm discussed above in FIG. 1. The station to station location based model may be based on the distance of the respective weather stations from a candidate weather station and the historical attribute errors for the respective weather stations in comparison to the candidate weather station. The station to station location based model may be a plot of weather attribute data errors or absolute difference between the weather data associated with the candidate weather station and the weather data associated with the respective weather station on a y axis and distance of the respective weather stations from the candidate weather station on an x axis. The processor 202 may cause the station to station location based model to be stored in a memory 204 for later use.

As shown at block 910 of FIG. 8, the apparatus 200 may include means, such as a processor 202, or the like, configured to discard weather data that satisfies a predetermined distance threshold. The processor 202 may compare the weather data to a predetermined distance threshold and discard weather data which satisfies the predetermined distance threshold. For example, in an instance in which the predetermined distance threshold is 50 kilometers, the processor 202 may discard weather data from the station to station location based model which is 50 kilometers or more from the candidate weather station.

As shown at block 912 of FIG. 8, the apparatus 200 may include means, such as a processor 202, or the like, configured to discard weather data which satisfies an outlier threshold. The processor 202 may determine the outlier threshold using a smoothing algorithm based on a function of the standard deviation of attribute difference or error at each distance unit, e.g. a tenth of a kilometer, a half kilometer, a full kilometer, or any other distance unit. Other possible smoothing algorithm may be functions of the standard error from mean, confidence intervals, clustering techniques, or the like. The weather data which satisfies the determined attribute difference may be discarded and removed from the station to station location based model.

As shown in block 914 of FIG. 8, the apparatus 200 may include means such as a processor 202, a communications interface 206, or the like, configured to cause the transmission of a weather query. The processor 202 may cause the communication interface 206 to transmit a weather query to candidate weather stations and/or the weather database using the network 110. The weather query may include the location of the apparatus and/or the location of one or more candidate weather stations. The processor 202 may receive an apparatus 200 location from a location module (not shown), such as a global positioning system, proximity sensor, or other location determination systems.

As shown in block 916 of FIG. 8, the apparatus 200 may include means, such as a processor 202, a communications interface 206, or the like, configured to receive current weather data and station to station location based models associated with a plurality of candidate weather stations. The current weather data and station to station location based models may be received periodically or in response to a weather query. The candidate weather stations may be all weather stations associated with the weather provider or a subset of the weather stations selected by the control system or the weather provider based on the apparatus 200 location.

As shown at block 918 of FIG. 8, the apparatus 200 may include means, such as a processor 202, or the like, configured to determine an expected attribute error based on the distance between the respective candidate weather station and the apparatus location. The processor 202 may determine the distance from the respective candidate weather stations 106 based on the apparatus 200 location and the candidate weather station locations. The processor 202 may use the distance between the apparatus 200 and the candidate weather stations 106 and the station to station location based model associated with the respective candidate weather station to determine an expected attribute error for each of the candidate weather stations. For example, if the distance is 50 kilometers from a candidate location the expected attribute error may be ~20 degrees Celsius, as depicted in FIG. 8.

As shown at block 920 of FIG. 8, the apparatus 200 may include means, such as a processor 202, or the like, configured to determine a weather data confidence based on a predetermined attribute threshold. The processor 202 may compare the weather data attribute errors of the candidate weather stations to a predetermined attribute error, such as 10 degrees Celsius. The processor 202 may determine that weather data from candidate weather stations which satisfies the predetermined threshold, e.g. is less than or equal to 10 degrees Celsius, is valid or has a high confidence, and weather data from candidate weather stations which fail to meet the predetermined temperature threshold, e.g. is greater than 10 degrees Celsius, is not valid or has a low confidence.

In an example embodiment, the processor 202 may, additionally or alternatively, assign a confidence value to the weather data based on the predetermined attribute error threshold. The confidence value may be inversely proportional to the attribute error for the respective weather station. For example, the processor 202 may assign a 50 percent confidence to a temperature error at the predetermined attribute value, e.g. 10 degrees Celsius. The processor 202 may assign higher confidence values to weather data having a smaller attribute error. For example a confidence of 75 percent may be assigned to weather data in an instance in which the temperature error is 5 degrees Celsius or 25 percent in an instance in which the temperature error is 15 degrees. The processor 202 may additionally compare the weather data confidence threshold to a predetermined confidence threshold, such as 60 percent. The weather data which satisfies the confidence threshold may be considered valid and weather data which fails to satisfy the threshold may be considered invalid.

As shown at block 922 of FIG. 8, the apparatus 200 may include means, such as a processor 202, or the like, configured to determine a weather condition based on the weather data which satisfies a predetermined weather data confidence threshold. The processor 202 may use weather data which has been determined to be valid to determine a weather condition. For example, the processor 202 may determine that the valid weather data indicated snow, rain, fog, ice, extreme heat, low light, or the like based on the various weather attributes.

In an instance in which weather data from more than one weather station satisfies the predetermined weather data confidence threshold, the weather data used for blocks 924 or 926 may be an average of the weather station data from the weather stations which satisfied the threshold. The weather data average may be a weighted average of the weather data. The weights for the weighted average may be based on the attribute error. In an example embodiment, the weighted average for each weather station weather data may be inversely proportional to the respective attribute error. Alternatively, the weather data with the lowest attribute error may be chosen, by the processor 202, for display or control of control system functions.

As shown at block 924 of FIG. 8, the apparatus 200 may include means, such as a processor 202, user interface 208, or the like, configured to cause weather data or weather conditions to be displayed based on the weather data which satisfies a predetermined weather data confidence threshold. The processor 202 may cause the user interface 208 to display valid weather data associated with one or more weather attributes and/or display weather conditions.

As shown at block 926 of FIG. 8, the apparatus 200 may include means, such as a processor 202, or the like, configured to activate or adjust apparatus 200 settings based on weather data which satisfies a predetermined weather data confidence threshold. The processor 202 may adjust climate control settings, window tint, headlights, or the like, based on the valid weather data.

The control system 102 may activate or adjust control system 102 settings based on the determined weather condition. For example, in an instance in which the control system 102 determines a weather condition associated with lowered traction, the control system 102 may activate or adjust a speed governor, anti-lock brakes, traction control, or the like.

The determination of valid weather data using the station to station location based model allows for more accurate weather determinations for control system 102 setting adjustments. Specifically, in the context or autonomous or highly assisted driving vehicles, the accurate determination of weather conditions may ensure that safety systems or other driving assistance are activated or adjusted in unsafe conditions, or when appropriate, while minimizing unnecessary activation or adjustments due to inaccurate or irrelevant weather data.

As described above, FIG. 9 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 902, 910, 912, 914, 922, 924, and 926 in FIG. 8. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving weather data and station to station location based models associated with a plurality of candidate weather stations, wherein (a) a model of the station to station location based models corresponds to (i) a respective candidate weather station and (ii) a particular weather attribute and (b) the model is generated based on a difference in weather data for the particular weather attribute between weather data corresponding to the respective candidate weather station and at least one other candidate weather station of the plurality of candidate weather stations;
determining, for the respective candidate weather station and the particular weather attribute, an expected attribute error for the particular weather attribute based on the distance from the respective candidate weather station and the station to station location based model associated with the respective candidate weather station;
determining weather data confidence for the weather station data of the respective candidate weather station for the particular weather attribute based on the expected weather attribute error determined based on the station to station location based models;
determining a weather condition for the particular weather attribute based on the weather data which satisfies a predetermined weather data confidence threshold; and
activating or adjusting control system settings based on the determined weather condition.

2. The method of claim 1 wherein the station to station location based models associated with a plurality of candidate weather stations are generated by a method comprising:
receiving historical weather data associated with a candidate weather station and the plurality of weather stations;
determining distances between the candidate weather station and respective ones of the plurality of weather stations; and
generating the station to station location based model of weather attribute errors associated with the distances between the candidate weather station and the respective weather stations of the plurality of weather stations.

3. The method of claim 2 further comprising:
discarding the weather data that satisfies a predetermined distance threshold.

4. The method of claim 2 further comprising:
discarding the weather data that satisfies a predetermined outlier threshold.

5. The method of claim 2 further comprising:
causing transmission of a weather query.

6. The method of claim 1 further comprising:
causing the weather data to be displayed based on the weather data confidence.

7. The method of claim 1 further comprising:
causing transmission of a weather query.

8. An apparatus comprising at least one processor and at least one memory including computer program code, the at least one memory and computer program code configured to, with the processor, cause the apparatus to at least:

receive weather data and station to station location based models associated with a plurality of candidate weather stations, wherein (a) a model of the station to station location based models corresponds to (i) a respective candidate weather station and (ii) a particular weather attribute and (b) the model is generated based on a difference in weather data for the particular weather attribute between weather data corresponding to the respective candidate weather station and at least one other candidate weather station of the plurality of candidate weather stations;

determine, for the respective candidate weather station, an expected attribute error for the particular weather attribute based on the distance from the respective candidate weather station and the station to station location based model for the particular weather attribute associated with the respective candidate weather station;

determine weather data confidence for the weather station data of the respective candidate weather station based on the expected weather attribute error for the particular weather attribute determined based on the station to station location based models;

determine a weather condition for the particular weather attribute based on the weather data which satisfies a predetermined weather data confidence threshold; and activate or adjust control system settings based on the determined weather condition.

9. The apparatus of claim 8, wherein the computer program code is configured to generate the station to station location based models of weather attribute errors, with the processor, by causing the apparatus to at least:

receive historical weather data associated with a candidate weather station and the plurality of weather stations;

determine distances between the candidate weather station and respective ones of the plurality of weather stations; and generate the station to station location based model of weather attribute errors associated with the distances between the candidate weather station and the respective weather stations of the plurality of weather stations.

10. The apparatus of claim 9, wherein the at least one memory and the computer program code are further configured to:

discard the weather data that satisfies a predetermined distance threshold.

11. The apparatus of claim 9, wherein the at least one memory and the computer program code are further configured to:

discard the weather data that satisfies a predetermined outlier threshold.

12. The apparatus of claim 9, wherein the at least one memory and the computer program code are further configured to:

cause transmission of a weather query.

13. The apparatus of claim 8, wherein the at least one memory and the computer program code are further configured to:

cause the weather data to be displayed based on the weather data confidence.

14. The apparatus of claim 8, wherein the at least one memory and the computer program code are further configured to:

cause transmission of a weather query.

15. A computer program product comprising at least one non-transitory computer-readable storage medium having computer-executable program code portions stored therein, the computer-executable program code portions comprising program code instructions configured to:

receive weather data and station to station location based models associated with a plurality of candidate weather stations, wherein (a) a model of the station to station location based models corresponds to (i) a respective candidate weather station and (ii) a particular weather attribute and (b) the model is generated based on a difference in weather data for the particular weather attribute between weather data corresponding to the respective candidate weather station and at least one other candidate weather station of the plurality of candidate weather stations;

determine, for the respective candidate weather station, an expected attribute error for the particular weather attribute based on the distance from the respective candidate weather station and the station to station location based model for the particular weather attribute associated with the respective candidate weather station;

determine weather data confidence for the weather station data of the respective candidate weather station based on the expected weather attribute error for the particular weather attribute determined based on the station to station location based models;

determine a weather condition for the particular weather attribute based on the weather data which satisfies a predetermined weather data confidence threshold; and activate or adjust control system settings based on the determined weather condition.

16. The computer program product of claim 15 wherein the computer-executable program code portions comprise program code instructions configured to:

generate the station to station location based model of weather attribute errors, wherein generating the station to station location based model of weather attribute errors comprises:

receiving historical weather data associated with a candidate weather station and the plurality of weather stations;

determining a distance between the candidate weather station and respective ones of the plurality of weather stations; and generating the station to station location based model of weather attribute errors associated with the distances between the candidate weather station and the respective weather stations of the plurality of weather stations.

17. The computer program product of claim 16, wherein the computer-executable program code portions further comprise program code instructions configured to:

discard the weather data that satisfies a predetermined distance threshold.

18. The computer program product of claim 16, wherein the computer-executable program code portions further comprise program code instructions configured to:

discard the weather data that satisfies a predetermined outlier threshold.

19. The computer program product of claim 16, wherein the computer-executable program code portions further comprise program code instructions configured to:

cause transmission of a weather query.

20. The computer program product of claim 15, wherein the computer-executable program code portions further comprise program code instructions configured to:

cause the weather data to be displayed based on the weather data confidence.

21. The computer program product of claim 15, wherein the computer-executable program code portions further comprise program code instructions configured to:
    cause transmission of a weather query.

\* \* \* \* \*